Aug. 10, 1954  G. F. QUAYLE  2,686,036
LINKAGE DEVELOPMENT FOR PALLET TRUCKS
Filed March 15, 1951  3 Sheets-Sheet 1
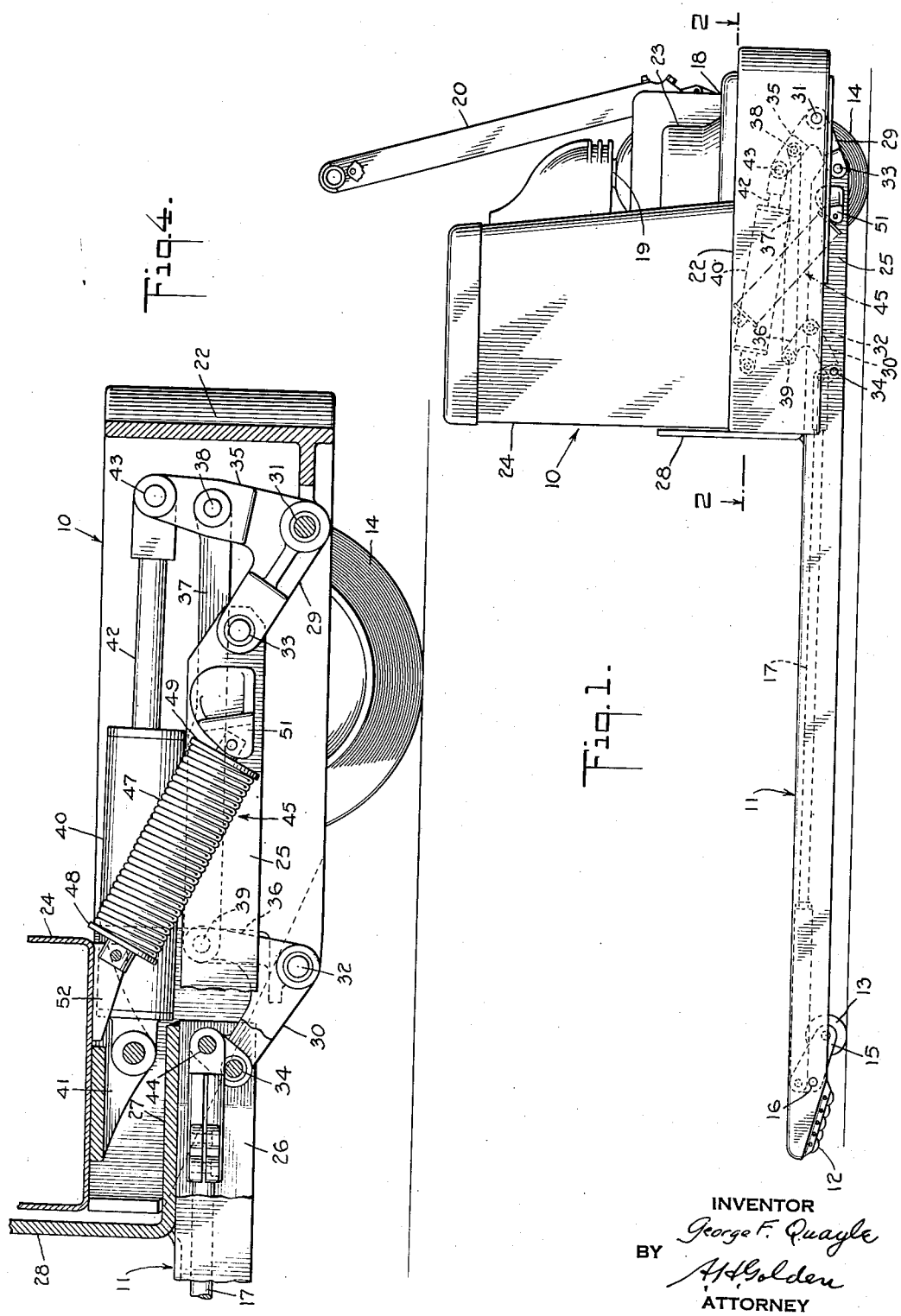
INVENTOR
George F. Quayle
BY
A. H. Golden
ATTORNEY

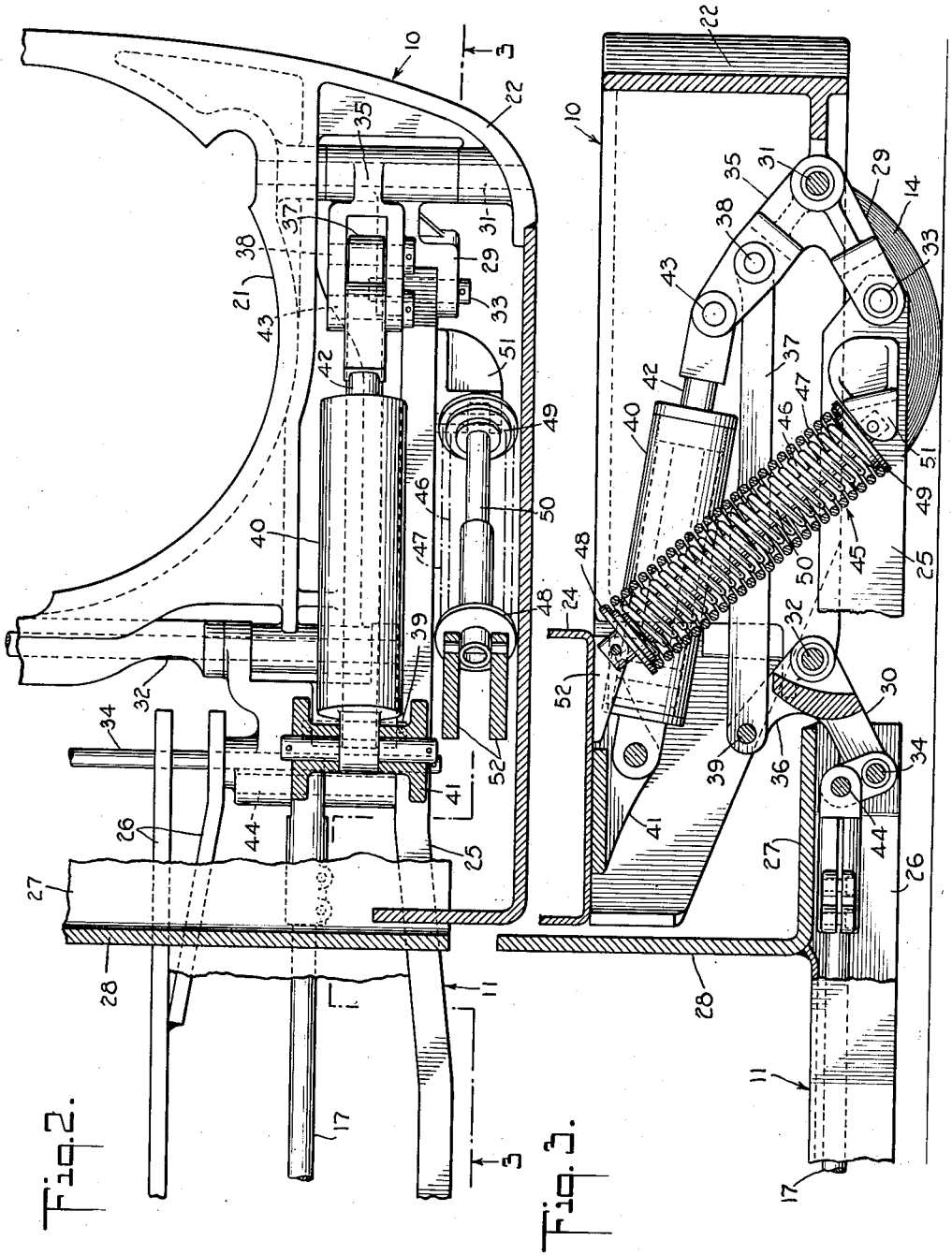

Aug. 10, 1954 G. F. QUAYLE 2,686,036
LINKAGE DEVELOPMENT FOR PALLET TRUCKS
Filed March 15, 1951 3 Sheets-Sheet 3
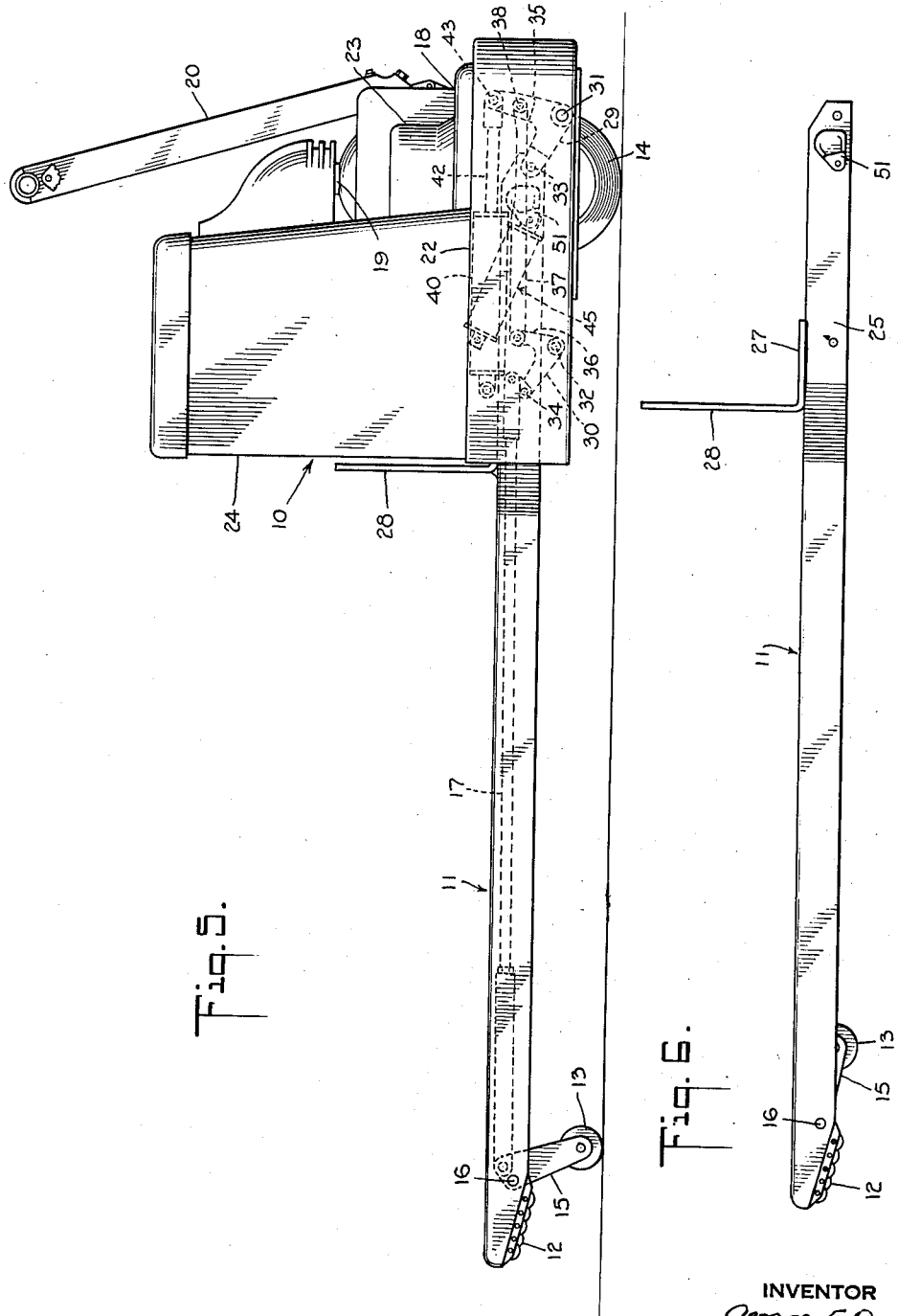
INVENTOR
George F. Quayle
BY
A. H. Golden
ATTORNEY Patented Aug. 10, 1954

2,686,036

UNITED STATES PATENT OFFICE 2,686,036

LINKAGE DEVELOPMENT FOR PALLET TRUCKS

George F. Quayle, Philadelphia, Pa., assignor to The Yale & Towne Manufacturing Company, Stamford, Conn., a corporation of Connecticut Application March 15, 1951, Serial No. 215,828

5 Claims. (Cl. 254—10)

This invention relates to industrial trucks of the class used for transporting pallets and skids, and more particularly to trucks of this class formed of two parts with the entire rear part adapted for vertical movement relatively to the front part of the truck, and with the rear part functioning as the platform that lifts and carries the load.

In trucks of this general class, the rear part is connected to the front part through pivoted links that guide and restrain the platform to parallel positions as it is lifted and lowered to different levels relatively to the front part. Such a construction is shown in Patent No. 2,234,925 entitled "Elevating Truck for Pallets and the Like," issued to Russell Hastings, Jr., on March 11, 1941; and in Patent No. 2,274,164 entitled "Lift Truck," issued to George Quayle on February 24, 1942.

Heretofore, the connecting link mechanism in trucks of this class has occupied a considerable amount of space in a direction longitudinally of the truck. This space could not be used for load carrying purposes and accounted for a certain portion of the length of the truck, thus requiring the trucks to be made longer than would otherwise be necessary.

I have now contributed a novel pallet truck of the class described in which the connecting link mechanism accounts for no part of the length of the truck whereby the load carrying platform may occupy a larger proportion of the length of the truck than heretofore, and the truck will be more maneuverable because of its reduced length.

As one feature of the invention, I connect the elevating platform to the front part of my novel truck by vertically swingable links that are located coextensively with the front part of the truck. The elevating platform is extended forwardly into lapping relationship to the front part of the truck in order to effect this connection, and the connecting mechanism thereby requires no standards or other parts located above the platform or between the front and rear parts of the truck. Obviously, therefore, the entire area of the platform part behind the front part of the truck may be made available to receive the load and the truck may be made shorter as a result.

Another feature of the invention resides in an extremely compact parallelogram arrangement of the links whereby the links are located in a fore and aft relationship. Preferably, the links are constructed to provide the necessary amplitude of movement by swinging past the base of the parallelogram. This arrangement permits the links to be located at the underside of the front part of the truck for operation in a space that is very narrow in a vertical sense. As a further feature of this part of the invention, the lifting rams which elevate the platform occupy fore and aft positions just above the links, thus requiring no additional space in a lateral sense and permitting the entire lifting and connecting mechanism to be mounted in the front part of the truck laterally of the front wheel and its steering and driving mechanisms.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important therefore that the claims to be granted me shall be of sufficient breadth to prevent the appropriation of my invention by those skilled in the art.

Referring now to the drawing:

Fig. 1 is an elevation showing a preferred form of my improved pallet truck, as it would appear with the platform in lowered position.

Fig. 2 is a cross-sectional plan view of a portion of the same on an enlarged scale, taken on the line 2—2 of Fig. 1, showing the construction of the connecting mechanism.

Fig. 3 is a longitudinal sectional view of the same taken substantially on the line 3—3 of Fig. 2.

Fig. 4 is a longitudinal sectional view similar to Fig. 3, but showing the connecting mechanism as it would appear when the elevating platform is in its uppermost position.

Fig. 5 is an elevation similar to Fig. 1, but showing the truck as it would appear when the elevating platform is raised.

Fig. 6 is an elevation showing the elevating platform disassembled from the front part of the truck in order to make clear its construction.

Referring now more specifically to the drawing, the preferred embodiment of my invention is in a pallet truck of the general class which has a front part or lifting head 10 and a rearwardly disposed elevating platform 11 connected for lifting and lowering movements relatively to the lifting head. The elevating platform 11 may take any form suitable for receiving the pallets with which it is to be used, and may present an unbroken flat surface or may be bifurcated to provide forks adapted to enter opposite sides of pallets having a central partition. The platform 11 is sufficiently thin to permit it to enter between the floors of a double faced pallet when the platform is lowered to a position closely adjacent the ground, and preferably is tapered at its rear end and provided with an inclined series of rollers 12 which will facilitate entry of the platform into the pallet.

As is customary in trucks of this class, one or more wheels 13 mounted below the rear portion of the platform 11 serve as the rear wheels of the truck, while a wheel 14 mounted in the front part or lifting head 10 supports the front of the truck. The rear wheel 13 is adapted to support the rear end of the platform 11 through its mounting which is in the form of a link 15 pivoted within the platform by a transverse pin 16. The rear wheel 13 and the link 15 are so constructed that they may be withdrawn almost completely within the platform 11, thus supporting the platform in a very low position and offering no obstruction to its entry into the pallet, while also permitting the link 15 to be projected as shown in Fig. 5 to lift and support the rear end of the platform and a pallet thereon. The link 15 is operated simultaneously with lifting and lowering movements of the front end of the platform 11 through a tension rod 17 which is operated in turn by means upon the front part or lifting head 10, to be described hereinafter.

The front wheel 14 is utilized for steering the truck and for this purpose is mounted by a steering mechanism comprising a turntable 18 and an upper bearing 19 on the steering head 10, and a manually operable handle 20 connected to the turntable 18. The turntable 18 is mounted in the usual way in a circular guide 21 which is formed integrally within a U-shaped member 22 that forms the outer frame of the lifting head 10.

When the truck is to be power operated, a suitable driving means 23 for the front wheel 14 is mounted within the turntable 18 as will be understood by those conversant with the art, and a compartment 24 for a battery or other source of power is integrally mounted upon the rear portion of the lifting head frame member 22.

The pallet truck construction thus far described is generally known and understood in the industry, and we now come to a description of the novel features whereby I contribute improved characteristics to such trucks. In the preferred form of my pallet truck, I provide a novel connecting mechanism that is underslung below the lifting head 10 and that is connected to the elevating platform 11 through a front end portion of the platform which extends forwardly in lapping relationship beneath the lifting head. Inasmuch as the right and left-hand sides of the elevating platform 11 are identical and are supported by substantially identical simultaneously operated units of the connecting mechanism at opposite sides of the lifting head 10, a description of the parts located at the right-hand side of the lifting head and shown in Figs. 2, 3 and 4 will suffice.

The forwardly extended portion of the elevating platform 11 may conveniently be provided at the right-hand side of the truck by extending the platform side rail 25 horizontally beneath the lifting head 10 laterally outward of the steering mechanism, and also by extending the intermediate platform rails 26 a relatively short distance toward the rear of the steering mechanism, it being understood that corresponding rails are extended forwardly at the left-hand side of the truck. This, of course, results in a bifurcated platform construction in which opposite sides are spaced outwardly at opposite sides of the steering mechanism. The front end of the elevating platform 11 is reinforced by a horizontal plate 27 integrally attached to the upper edges of all of the platform rails beneath the lifting head by any suitable means such as welding, this plate preferably being formed with an upturned flange 28 closely adjacent the rear of the lifting head 10, thus imparting lateral rigidity to the platform and serving as a guard to prevent any portion of the load on the platform from entering beneath the lifting head.

The right-hand side of the elevating platform 11 is supported for lifting and lowering movement relative to the lifting head 10 by a forward link 29 and a rearward link 30 mounted at their front ends for vertical swinging movement on transverse pivot shafts 31, 32 in the lifting head 10. The rearward ends of the links 29, 30 are attached to the rail 25 through transverse pivot shafts 33, 34, and these links form with the lifting head 10 and the rail 25 a parallelogram arrangement defined at its corners by the pivot shafts 31, 32, 33 and 34. As long as this parallelogram arrangement is maintained, it will of course restrain the elevating platform 11 to parallel positions with respect to the lifting head 10.

However, it will here be noted that the necessary amplitude of lifting movement is obtainable by causing the links 29, 30 to swing past the base of the parallelogram as defined by the pivot shafts 31, 32, this being apparent from a comparison of Figs. 3 and 4. In order to permit this movement, the rearward link 30 is located at the inner side of the platform rail 25, the pivot shaft 34 being supported in the intermediate platform rails 26 as well as in the rail 25 so as to avoid excessive strains in said shaft. Inasmuch as the forward link 29 is located at the end of the platform rail 25, it may swing around the end of said rail and need not be mounted entirely at one side of the rail.

While the link arrangement described permits the necessary movement to be obtained by relatively short links within a small space, it will be observed that a critical condition occurs when the links 29, 30 are horizontally aligned with each other and with the rail 25, at an intermediate point in their movement. Because of the fact that in this position all sides of the described parallelogram will coincide, there will then be nothing to maintain the parallel relationship of the platform 11 to the lifting head 10 unless some additional means is provided for this purpose. In other words, when the links 29, 30 are swung upwardly from the position shown in Fig. 3, the parallelogram relationship will be maintained only so long as the rearward pivot shafts 33, 34 are not aligned with the forward pivot shafts 31, 32, and when these pivot shafts become aligned in a horizontal plane, or nearly so, the tendency of the rearward link 30 will not necessarily be to follow continued upward movement of the link 29, and the link 30 may tend to swing downwardly in a reverse direction. Further, even if there is no tendency for a reversed movement of one of the links in this position, a toggling effect would be likely to occur that would lock the parts so as to prevent further movement, and this condition would be aggravated by any minute inaccuracy in the bearings or in the dimensions of the parts.

In order to avoid this critical condition, therefore, I provide upwardly extending parallel arms 35, 36, integral with the respective links 29, 30, whereby these links are in the form of bell crank levers. Upper portions of the arms 35, 36 are connected by a rod 37 pivoted thereto by pins 38, 39, the rod 37 defining with the arms 35, 36, and the lifting head 10 an auxiliary parallelogram arrangement which will remain in full effect while the main links 29, 30 are at and near their critical horizontal positions. Thus, the elevating platform 11 will be maintained horizontal and parallel to the lifting head 10 at all times without toggling of the links or any other irregularity of movement.

Operation of the elevating platform 11 is provided at the right-hand side of the truck by a hydraulic ram 40 which acts through the upper forward bell crank arm 35 to swing the links 29, 30 upwardly. The ram 40 is located in an approximately horizontal position directly above the auxiliary parallelogram rod 37 and is pivotally anchored to a rearward portion of the lifting head 10 as by a bracket 41 welded or otherwise secured to the bottom of the battery compartment 24. The ram plunger 42 is attached to an upward extension of the bell crank arm 35 by a pivot pin 43, whereby the admission of fluid under pressure to the ram will swing the arm 35 forwardly to raise the platform 11.

In order that the rear end of the lifting platform 11 shall be raised simultaneously with the action of the ram 40 in lifting the front end of the platform, the rearward link 30 is provided with a pivot pin 44 offset upwardly from the shaft 34, the front end of the tension rod 17 being connected to this pin 44. It will be understood that the rear wheel 13 and its operating mechanism may be duplicated at opposite sides of the truck, and will then be operated by the lifting mechanism at opposite sides of the lifting head 10.

Under some conditions, as when there is little or no load upon the platform 11, it may be necessary that a downward force be applied to the platform in order to insure its downward movement when such movement is desired. For this purpose, I provide a coil spring unit 45 which exerts a downward force upon the front end portion of the platform rail 25 at all times. The spring unit 45 is located in an inclined position outwardly of the rail 25, and preferably comprises an inner spring 46 and an outer spring 47 confined between end retainers 48, 49, fixed upon opposite end portions of a telescoping guide 50, the lower end of the guide being pivotally connected to a bracket 51 on the rail 25, and the upper end thereof being anchored to brackets 52 on the lower side of the battery compartment 24 or otherwise attached to the lifting head 10. It will thus be seen that movement of the platform 11 to its lowermost position will be assured excepting at such times as it may be raised or held by the action of the ram 40. The spring unit 45 will also act to avoid accidental upward movement of the elevating platform which would otherwise result from engagement of the inclined series of rollers 12 with the lower floor of a pallet when the platform is inserted into the pallet.

I have thus provided a connecting mechanism for a pallet truck of the class described which is very compact and which is located entirely at the under side of the lifting head so as to account for no portion of the length of the truck.

It is believed that the operation of my novel pallet truck will be clearly apparent from the foregoing description. It may be further observed, however, that my invention readily lends itself to the construction of trucks having platforms of different widths without any basic change in the lifting head. Thus, without reward to the specific width of the elevating platform 11, the outer side rails 25 of the platform may be offset to occupy the proper position in the lifting head 10, and the offset portion of the link 30 may be recessed to accommodate the rear end of the tension rod 17 at the proper lateral location upon the pivot pin 34.

I now claim:

1. In a lift truck of the class described, a lifting head, a front steering wheel rotatable relatively to said lifting head, means mounting said wheel on said lifting head against vertical movement relatively thereto for supporting said lifting head, an elevating platform, wheel supporting links movably mounted at the rear end of said platform, a front end portion on said platform bifurcated to form a portion positioned at each side of said lifting head and said front steering wheel, two front end links for each side of said truck, means pivoting said front end links at each side to said lifting head at two longitudinally spaced points, means similarly pivoting each of said front end links also to each of said front end portions of said platform formed by the bifurcation thereof, said links at each side of the truck forming with the platform and lifting head a parallelogram arrangement for mutually supporting the said lifting head and the front end of said elevating platform, hydraulic means for imparting lifting movement to said platform upwardly relatively to said lifting head on said front end links, means whereby movement of said elevating platform relatively to said lifting head on said front end links actuates said rear wheel supporting links to lift the rear end of said platform simultaneously with upward movement of said platform on said front end links.

2. In a lift truck of the class described, a lifting head, a front steering wheel rotatable relatively to said lifting head, means mounting said wheel on said lifting head against vertical movement relatively thereto for supporting said lifting head, an elevating platform, wheel supporting links movably mounted at the rear end of said platform, a front end portion on said platform bifurcated to form a portion positioned at each side of said lifting head and said front steering wheel, two front end links for each side of said truck, means pivoting said front end links at each side to said lifting head at two longitudinally spaced points, means similarly pivoting each of said front end links also to each of said front end portions of said platform formed by the bifuration thereof, said links at each side of the truck forming with the platform and lifting head a parallelogram arrangement for mutually supporting the said lifting head and the front end of said elevating platform, means extending between the links at each side of the lifting head and steering wheel for maintaining the angular movements of said links equal, hydraulic means for imparting lifting movement to said platform upwardly relatively to said lifting head on said front end links, and means whereby movement of said elevating platform relatively to said lifting head on said front end links actuates said rear wheel supporting links to lift the rear end of said platform simultaneously with upward movement of said platform on said front end links.

3. In a lift truck of the class described, a lifting head, a front steering wheel rotatable relatively to said lifting head, means mounting said wheel on said lifting head against vertical movement relatively thereto for supporting said lifting head, an elevating platform, wheel supporting links movably mounted at the rear end of said platform, a front end portion on said platform bifurcated to form a portion positioned at each side of said lifting head and said front steering wheel, two front end links for each side of said truck, means pivoting said front end links at each side to said lifting head at two longitudinally spaced points, means similarly pivoting each of said front end links also to each of said front end portions of said platform formed by the bifurcation thereof, said links at each side of the truck forming with the platform and lifting head a parallelogram arrangement for mutually supporting the said lifting head and the front end of said elevating platform, a rod extending between the links at each side of the lifting head for maintaining the angular movement of said links equal, a hydraulic ram at each side of said lifting head, means through which each ram actuates one of the links at the corresponding side of the lifting head whereby to lift the elevating platform relatively to the lifting head on said links, means for moving said platform upwardly relatively to said lifting head on said front end links, and means whereby movement of said elevating platform relatively to said lifting head on said front end links actuates said rear wheel supporting links to lift the rear end of said platform simultaneously with upward movement of said platform on said front end links.

4. In a lift truck of the class described, a lifting head, a front steering wheel rotatable relatively to said lifting head, means mounting said wheel on said lifting head against vertical movement relatively thereto for supporting said lifting head, an elevating platform, wheel supporting links movably mounted at the rear end of said platform, a front end portion on said platform bifurcated to form a portion positioned at each side of said lifting head and said front steering wheel, two front end links for each side of said truck, means pivoting said front end links at each side to said lifting head at two longitudinally spaced points, means similarly pivoting each of said front end links also to each of said front end portions of said platform formed by the bifurcation thereof, said links at each side of the truck forming with the platform and lifting head a parallelogram arrangement for mutually supporting the said lifting head and the front end of said elevating platform, a rod extending between the links at each side of the lifting head for maintaining the angular movements of said links equal, a hydraulic ram at each side of said lifting head, means through which each ram actuates one of the links at the corresponding side of the lifting head whereby to lift the elevating platform relatively to the lifting head on said links, and means whereby movement of said elevating platform relatively to said lifting head on said front end links actuates said rear wheel supporting links to lift the rear end of said platform simultaneously with upward movement of said platform on said front end links.

5. In a lift truck of the class described, a lifting head, a front steering wheel rotatable relatively to said lifting head, means mounting said wheel on said lifting head against vertical movement relatively thereto for supporting said lifting head, an elevating platform, wheel supporting links movably mounted at the rear end of said platform, a front end portion on said platform bifurcated to form a portion positioned at each side of said lifting head and said front steering wheel, two bell crank links for each side of the truck, means pivoting one end of each bell crank link to one of said front end portions of the elevating platform formed by the bifurcation thereof, means pivoting each bell crank link at each side of the truck to said lifting head at longitudinally spaced points opposite said front end portions whereby said links form with the lifting head and said front end portions of the platform a parallelogram arrangement abreast of the front steering wheel at each side thereof for mutually supporting the said lifting head and the front end of said elevating platform, hydraulic means for imparting lifting movement to said platform upwardly relatively to said lifting head on said front end links, and means whereby movement of said elevating platform relatively to said lifting head on said front end links actuates said rear wheel supporting links to lift the rear end of said platform simultaneously with upward movement of said platform on said front end links.

References Cited in the file of this patent

UNITED STATES PATENTS

| Number | Name | Date |
|---|---|---|
| 2,417,018 | Schroeder | Mar. 4, 1947 |
| 2,417,396 | Framhein | Mar. 11, 1947 |
| 2,548,322 | Schroeder | Apr. 10, 1951 |
| 2,560,608 | Stoner | July 17, 1951 |
| 2,592,091 | Weaver | Apr. 8, 1952 |

FOREIGN PATENTS

| Number | Country | Date |
|---|---|---|
| 76,962 | Sweden | Dec. 13, 1930 |